(12) United States Patent
Andres

(10) Patent No.: US 7,247,119 B2
(45) Date of Patent: Jul. 24, 2007

(54) MULTI-SPEED PLANETARY POWER TRANSMISSION

(75) Inventor: Marc Andres, Schiltigheim (FR)

(73) Assignee: GM Global Technology Operations, Inc., Detroit, MI (US)

( * ) Notice: Subject to any disclaimer, the term of this patent is extended or adjusted under 35 U.S.C. 154(b) by 212 days.

(21) Appl. No.: 11/172,506

(22) Filed: Jun. 30, 2005

(65) Prior Publication Data

US 2007/0004551 A1    Jan. 4, 2007

(51) Int. Cl.
 *F16H 3/62*    (2006.01)
(52) U.S. Cl. ..................................... 475/275
(58) Field of Classification Search ............... 475/275, 475/276, 277, 278, 279
See application file for complete search history.

(56) References Cited

U.S. PATENT DOCUMENTS

| | | | | |
|---|---|---|---|---|
| 5,030,186 A * | 7/1991 | Asada | ........................ | 475/278 |
| 5,087,232 A * | 2/1992 | Asada | ........................ | 475/278 |
| 6,723,018 B2 * | 4/2004 | Hayabuchi et al. | ......... | 475/276 |
| 6,752,738 B1 * | 6/2004 | Martin et al. | ............... | 475/276 |
| 6,755,765 B2 * | 6/2004 | Usoro et al. | ................ | 475/275 |
| 6,802,795 B2 * | 10/2004 | Miyazaki et al. | ........... | 475/275 |
| 6,824,492 B2 * | 11/2004 | Tabata et al. | ............... | 475/276 |
| 6,976,931 B2 * | 12/2005 | Raghavan et al. | .......... | 475/296 |
| 7,153,231 B2 * | 12/2006 | Usoro et al. | ................ | 475/275 |
| 7,175,561 B2 * | 2/2007 | Usoro et al. | ................ | 475/275 |
| 7,192,378 B2 * | 3/2007 | Raghavan et al. | .......... | 475/276 |
| 2004/0102281 A1 * | 5/2004 | Lee et al. | .................... | 475/276 |
| 2005/0026739 A1 * | 2/2005 | Ishimaru | ..................... | 475/277 |
| 2005/0085333 A1 * | 4/2005 | Tiesler et al. | ............... | 475/275 |
| 2005/0113205 A1 * | 5/2005 | Oguri et al. | ................ | 475/275 |
| 2005/0130787 A1 * | 6/2005 | Usoro et al. | ................ | 475/275 |
| 2005/0272554 A1 * | 12/2005 | Raghavan et al. | .......... | 475/286 |

* cited by examiner

*Primary Examiner*—Sherry Estremsky

(57) ABSTRACT

A power transmission for use in a powertrain has an input shaft, an output shaft, an input planetary gearset, and an output planetary gearset. The planetary gearsets are controlled through the selective engagement of seven torque-transmitting mechanisms, three of which are rotating-type torque-transmitting mechanisms and four of which are stationary-type torque-transmitting mechanisms. By selective engagement of the torque-transmitting mechanisms in combinations of three, the input planetary gearset and the output planetary gearset are combined to establish eight forward speed ratios between the input shaft and the output shaft.

5 Claims, 2 Drawing Sheets

| Gear | Clutch A | Clutch B | Clutch C | Clutch D | Clutch E | Clutch F | Clutch G |
|------|----------|----------|----------|----------|----------|----------|----------|
| Rev  |          | X        |          |          | X        |          | X        |
| 1    | X        |          |          |          | X        |          | X        |
| 2    | X        |          |          |          |          | X        | X        |
| 3    | X        |          |          | X        |          |          | X        |
| 4    | X        | X        |          |          |          |          | X        |
| 5    | X        |          | X        |          |          |          | X        |
| 6    | X        | X        | X        |          |          |          |          |
| 7    |          | X        | X        |          |          |          | X        |
| 8    |          |          | X        | X        |          |          | X        |
| 9    |          |          | X        |          |          | X        | X        |

*FIG. 2*

MULTI-SPEED PLANETARY POWER TRANSMISSION

TECHNICAL FIELD

This invention relates to power transmissions and, more particularly, to multi-speed planetary-type power transmissions.

BACKGROUND OF THE INVENTION

Planetary power transmissions are used in both passenger vehicle and commercial vehicle applications. The powertrain in these vehicles generally includes an engine, a multi-speed transmission, and an output mechanism or differential.

The passenger vehicle of the past generally used a countershaft or synchronous-type transmission for providing the various speeds between the input and the output. Currently, both countershaft-type transmissions and planetary-type transmissions are employed in vehicle powertrains. In planetary-type transmissions, two or more planetary gearsets are controlled by a plurality of torque-transmitting mechanisms, commonly termed clutches and brakes to establish a plurality of speed ratios between a transmission input and a transmission output.

The planetary transmissions began as two-speed transmissions and developed into three-speed, four-speed, and five-speed type transmissions. Currently, there are a number of five-speed transmission units which are well known to the public, and also six-speed transmission units. One particular five-speed transmission is seen in U.S. Pat. No. 5,106,352 issued to Lepelletier on Apr. 21, 1992. The Lepelletier transmission incorporates an input gear mechanism or ratio-controlled set and an output planetary gearset, which provides a plurality of speed ratios. The Lepelletier concept employs five torque-transmitting mechanisms in the form of three rotating type or clutches and two stationary type or brakes.

It has become desirable more recently to incorporate six forward speed ratios in the planetary transmission, thereby improving the overall performance and economy of the passenger vehicle.

SUMMARY OF THE INVENTION

It is an object of the present invention to provide an improved multi-speed planetary power transmission providing at least eight forward speed ratios and one reverse speed ratio.

In one aspect of the present invention, the powertrain incorporating a planetary gear arrangement has an input planetary gearset and an output planetary gearset.

In another aspect of the present invention, the input planetary gearset is operable to provide an underdrive input during many of the forward gear ratios and the reverse operation.

In yet another aspect of the present invention, the output planetary gearset is a compound double planetary gearset having two sun gears, two ring gears, and a planet carrier assembly with a plurality of pinion gears interconnecting the sun gears and ring gears.

In yet another aspect of the present invention, the pinion gears include a plurality of long pinion gears, and two sets of short pinion gears with the long pinions meshing between one sun gear and one ring gear, one set of short pinions meshing between the long pinion gears and the other ring gear, and the other set of short pinions meshing between the long pinion gears and the other sun gear.

In still another aspect of the present invention, seven selectively engageable torque-transmitting mechanisms are provided to establish a plurality of ratios between the input shaft and the output shaft of the planetary transmission.

In yet still another aspect of the present invention, one of the torque-transmitting mechanisms is effective to establish a reduction drive output of the input planetary transmission.

In a yet still another aspect of the present invention, three of the torque-transmitting mechanisms are rotating-type torque-transmitting mechanisms, or clutches, and four of the torque-transmitting mechanisms are stationary-type torque-transmitting mechanisms, or brakes.

In a further aspect of the present invention, three of the stationary torque-transmitting mechanisms are operable to control the rotation of three members of the output planetary gearset and three of the rotating torque-transmitting mechanisms are operable to control input drives to the output planetary gearset.

In a yet further aspect of the present; invention, the torque-transmitting mechanisms are engaged in combinations of three to establish nine forward speed ratios between the input shaft and the output shaft of the planetary transmission.

DESCRIPTION OF THE DRAWINGS

FIG. 2 is a chart describing the engagement sequence of the torque-transmitting mechanisms operable with the transmission shown in FIG. 1.

DESCRIPTION OF AN EXEMPLARY EMBODIMENT

Figure 1:
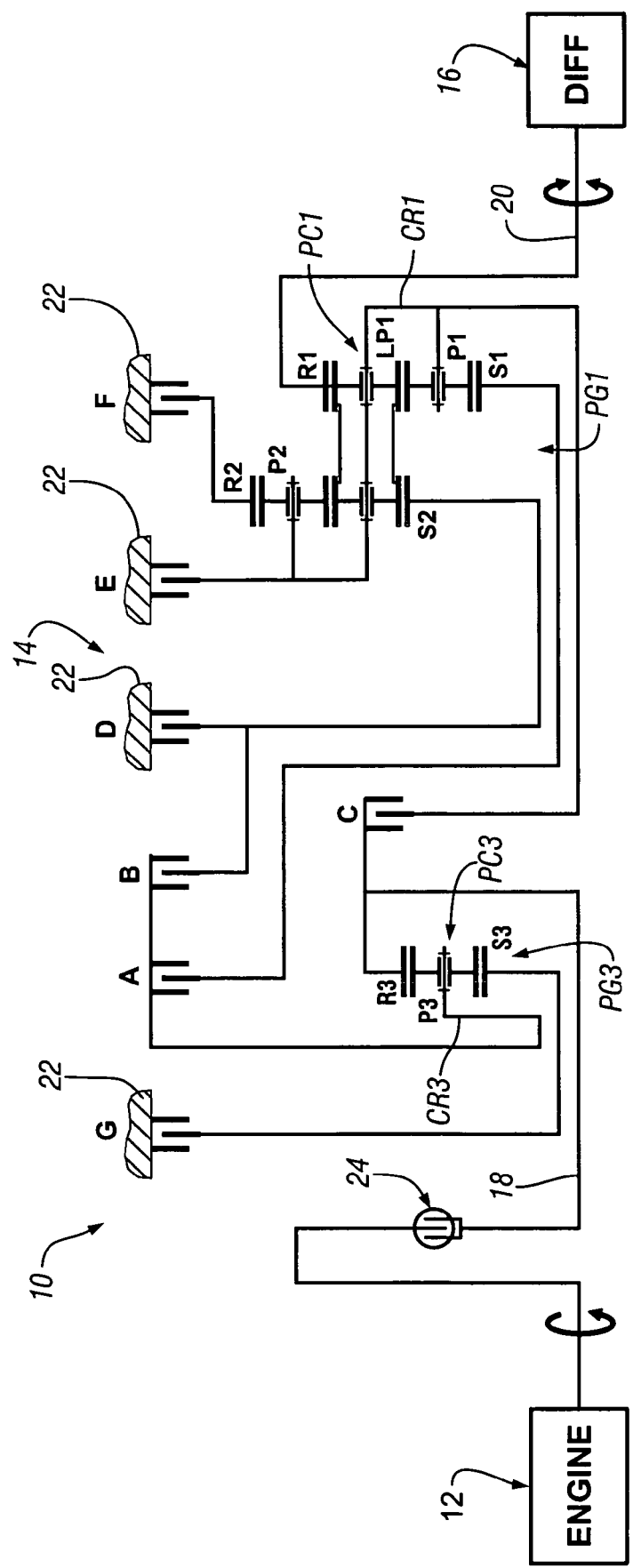
FIG. 1 is a schematic representation of a powertrain having a planetary power transmission incorporating the present invention.

A powertrain 10 shown in FIG. 1 includes an engine 12, a planetary gearset 14, and an output mechanism or differential 16. The planetary gearset 14 has an input shaft 18, an output planetary gearset PG1, an input planetary gearset PG3, an output shaft 20, and seven torque-transmitting mechanisms A, B, C, D, E, F, and G.

The torque-transmitting mechanisms A, B, and C are rotating-type torque-transmitting mechanisms, or clutches, while the torque-transmitting mechanisms D, E, F, and G are stationary-type torque-transmitting mechanisms, or brakes. Each of the torque-transmitting mechanisms D, E, F, and G has a portion thereof connected to a stationary member 22, which can be the transmission housing.

The output planetary gearset PG1 has two sun gears S1, S2; two ring gears R1, R2; and a planet carrier assembly PC1. The planet carrier assembly PC1 includes a planet carrier CR1 on which is rotatably mounted a plurality of long pinions LP1, a first plurality of short pinions P1, and a second plurality of short pinions P2. Short pinions P1 mesh with the sun gear S1 and with respective long pinions LP1; the long pinions LP1 mesh with the ring gear R1 and the sun gear S2; and the plurality of short pinions P2 mesh with respective one of the long pinions LP1 and the ring gear R2. The ring gear R1 is continuously connected with the output shaft 20.

The input planetary gearset PG3 has a sun gear member S3, a ring gear member R3, and a planet carrier assembly PC3. The planet carrier assembly PC3 has a planet carrier CR3 on which is rotatably mounted a plurality of pinion gears P3, which meshingly engage the sun gear S3 and ring gear R3. The input planetary gearset PG3 is a simple planetary gearset and the output planetary gearset PG1 is a compound double planetary gearset constructed in the fashion of a Ravigneaux-type planetary gearset.

The ring gear member R3 is continuously drivingly connected with the input shaft 18, which is continuously connected with the engine 12 through a conventional vibration damper 24. The sun gear member S3 is operatively connected with the torque-transmitting mechanism G. The input shaft 18 and ring gear member R3 are both operatively connected with the torque-transmitting mechanism C3, which is also operatively connected with the planet carrier CR1. The planet carrier CR3 is operatively connected with the torque-transmitting mechanisms A and B, which in turn are operatively connected with the sun gear members S1 and S2, respectively. The torque-transmitting mechanism D is operatively connected with the sun gear member S2. The torque-transmitting mechanism E is operatively connected with the planet carrier CR1. The torque-transmitting mechanism F is operatively connected with the ring gear member R2.

When the torque-transmitting mechanism G is engaged, the sun gear member S3 is stationary. When the torque-transmitting mechanism C is engaged, the input shaft 18 and ring gear member R3 are connected with the planet carrier CR1. When the torque-transmitting mechanism A is engaged, the planet carrier CR3 is connected with the sun gear member S1. When the torque-transmitting mechanism B is engaged, the planet carrier CR3 is connected with the sun gear member S2. When the torque-transmitting mechanisms D, E, and F are engaged individually, the sun gear member S3, the planet carrier CR1, and ring gear member R2 are selectively held stationary, respectively.

The chart shown in FIG. 2 describes the selective engagement and the engagement schedule for the torque-transmitting mechanisms A, B, C, D, E, F, and G in order to provide a reverse drive ratio and nine forward drive ratios. When the torque-transmitting mechanism C is engaged, the planet carrier CR1 will be rotated at the same speed as the engine 12. When the torque-transmitting mechanisms A and B are engaged, the sun gear members S1 and S2, respectively, will rotate at the same rate of speed as the planet carrier CR3 is rotated. When the torque-transmitting mechanism G is engaged, the planet carrier CR3 is rotated at a reduced speed relative to the input shaft 18. Thus, the sun gear members S1 and S2 are capable of having reduced speed inputs connected therewith.

It will be appreciated that the torque-transmitting mechanism G is effective only in controlling the sun gear member S3 of the input planetary gearset PG3. The remaining torque-transmitting mechanisms are effective to control portions of the output planetary gearset PG1, thereby affecting the speed ratios that are generated in the planetary gearset PG1.

The torque transmitting mechanisms are engaged in combinations of three to produce the nine forward drive ratios and one reverse ratio. The transmission 14 is also operable to produce less than nine forward ratios and in some instances an eight speed transmission might be more desirable. The torque-transmitting mechanism G is engaged for the reverse ratio and eight of the forward ratios. The torque-transmitting mechanism A is engaged for six consecutive forward ratios and the torque-transmitting mechanism C is engaged for five consecutive forward ratios.

The ration interchanges are all single transition interchanges. That is only one torque-transmitting mechanism is engaged simultaneous with the disengagement of only one torque-transmitting mechanism. All of the torque-transmitting mechanisms are engaged for at least two speed ratios. If a seven speed transmission is employed, the torque-transmitting mechanism F (forward ratios 2 and 9) or the torque-transmitting mechanism D (forward ratios 3 and 8) can be omitted. The ratio interchanges would remain single transition interchanges.

The invention claimed is:

1. A multi-speed power transmission comprising:
   an input shaft;
   an output shaft;
   an input planetary gearset having first, second, and third members, said second member being continuously connected with said input shaft;
   an output planetary gearset having first, second, third, fourth, and fifth members;
   a first selectively engageable torque-transmitting mechanism interconnecting said third member of said input planetary gearset with said first member of said output planetary gearset;
   a second torque-transmitting mechanism selectively interconnecting said third member of said first planetary gearset with said second member of said output planetary gearset;
   a third torque-transmitting mechanism selectively engageable between said input shaft and said fifth member of said output planetary gearset;
   a fourth torque-transmitting mechanism selectively engageable to connect said second member of said output planetary gearset with a stationary housing;
   a fifth torque-transmitting mechanism selectively engageable to connect said fifth member of said output planetary gearset with said stationary housing;
   a sixth torque-transmitting mechanism selectively engageable to connect said fourth member of said output planetary gearset with said housing;
   a seventh torque-transmitting mechanism selectively engageable to connect said first member of said input planetary gearset with said housing;
   said third member of said output planetary gearset being continuously interconnected with said output shaft;
   said torque-transmitting mechanisms being selectively engaged in combinations of three to establish at least eight forward speed ratios and one reverse speed ratio in said planetary transmission between said input shaft and said output shaft.

2. The multi-speed transmission defined in claim 1, further wherein:
   said seventh torque-transmitting mechanism is effective when engaged to establish a reduced speed drive between said transmission input shaft and said third member of said first planetary gearset.

3. The multi-speed transmission defined in claim 1, further wherein:
   said second, fifth, and seventh torque-transmitting mechanisms are selectively engaged to provide the reverse speed ratio, said first, fifth, and seventh torque-transmitting mechanisms are selectively engaged to provide the first forward speed ratio, said first, sixth, and seventh torque-transmitting mechanisms are engaged to provide the second forward speed ratio, said first, fourth, and seventh torque-transmitting mechanisms are selectively engaged to provide the third forward speed ratio, said first, second, and seventh torque-transmitting mechanisms are selectively engaged to provide the fourth forward speed ratio, said first, third, and seventh torque-transmitting mechanisms are selectively engaged to provide the fifth forward speed ratio, said first, second, and third torque-transmitting mechanisms are selectively engaged to provide the sixth forward speed ratio, said second, third, and seventh torque-transmitting mechanisms are selectively engaged to provide the seventh forward speed ratio, and said third, fourth, and seventh torque-transmitting mechanisms are selectively engaged to provide the eighth forward speed ratio.

4. The multi speed transmission defined in claim 1 further wherein:

said torque transmitting mechanisms are engaged in combinations of three to provide nine forward speed ratios.

5. The multi-speed transmission defined in claim 4, further wherein:

said second, fifth, and seventh torque-transmitting mechanisms are selectively engaged to provide the reverse speed ratio;

said first, fifth, and seventh torque-transmitting mechanisms are selectively engaged to provide the first forward speed ratio;

said first, sixth, and seventh torque-transmitting mechanisms are engaged to provide the second forward speed ratio;

said first, fourth, and seventh torque-transmitting mechanisms are selectively engaged to provide the third forward speed ratio;

said first, second, and seventh torque-transmitting mechanisms are selectively engaged to provide the fourth forward speed ratio;

said first, third, and seventh torque-transmitting mechanisms are selectively engaged to provide the fifth forward speed ratio;

said first, second, and third torque-transmitting mechanisms are selectively engaged to provide the sixth forward speed ratio;

said second, third, and seventh torque-transmitting mechanisms are selectively engaged to provide the seventh forward speed ratio;

said third, fourth, and seventh torque-transmitting mechanisms are selectively engaged to provide the eighth forward speed ratio; and said third, sixth, and seventh torque transmitting mechanisms are selectively engaged to provide the ninth forward speed ratio.

* * * * *